(12) United States Patent
Beyer et al.

(10) Patent No.: US 7,165,063 B2
(45) Date of Patent: Jan. 16, 2007

(54) CONTEXT QUANTIFIER TRANSFORMATION IN XML QUERY REWRITE

(75) Inventors: Kevin S. Beyer, San Jose, CA (US); Roberta J. Cochrane, Los Gatos, CA (US); Fatma Ozcan, San Jose, CA (US); Normen Seemann, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 10/717,870

(22) Filed: Nov. 19, 2003

(65) Prior Publication Data

US 2005/0108209 A1    May 19, 2005

(51) Int. Cl.
*G06F 17/30* (2006.01)
(52) U.S. Cl. .................................. 707/3; 707/4; 707/5
(58) Field of Classification Search ................ 707/1–10
See application file for complete search history.

(56) References Cited

U.S. PATENT DOCUMENTS

| | | | |
|---|---|---|---|
| 5,987,455 A | | 11/1999 | Cochrane et al. |
| 2003/0070144 A1 | | 4/2003 | Schnelle et al. |
| 2004/0083209 A1 | * | 4/2004 | Shin .............................. 707/3 |
| 2004/0103105 A1 | * | 5/2004 | Lindblad et al. ............ 707/100 |
| 2004/0225643 A1 | * | 11/2004 | Alpha et al. .................... 707/3 |
| 2004/0260691 A1 | * | 12/2004 | Desai et al. ..................... 707/4 |
| 2004/0267760 A1 | * | 12/2004 | Brundage et al. ........... 707/100 |
| 2005/0004892 A1 | * | 1/2005 | Brundage et al. ............... 707/3 |

OTHER PUBLICATIONS

Processing XML View Queries Including User-defined Foreign Functions on Relational Databases; Yoshiharu Ishikawa, et al.;Institute of Information Science and Electronics, Graduate School in Systems and Information Engineering, University of Tsukuba; Proceedings of the 3rd International Conference on Web Information Systems Engineering- 2002 IEEE Computer Society.
A Comprehensive XQuery to SQL Translation using Dynamic Interval Encoding; David Dehaan, et al.; University of Waterloo, School of Computer Science, Waterloo, Canada.
Active XQuery; Angela Bonifati, et al.; Dipartimento de Electronica e Informazione, Politecnico di Milano; Piazza Leonardo de vinci 32, I-20133 Milano, Italy; Proceedings of the 18 International Conference on Data Engineering- 2002 IEEE Computer Society.
Integrating Hetrogeneous Data Sources with XML and XQuery; G. Gardarin, et al.; e-XMLMedia, 31 Avenue du General Leclerc, 92340 Bourg LaReine, France; Proceedings of the 13th International Workshop on Database and Expert Systems Applications- 2002 IEEE Computer Society.

(Continued)

*Primary Examiner*—Khanh B. Pham
*Assistant Examiner*—Emeka Ebirim
(74) *Attorney, Agent, or Firm*—Fay, Sharpe, Fagan, Minnich & McKee, LLP (57) ABSTRACT

An XML query compilation processor (20) includes an execution compiler (42) that transforms an XML query into an executable XML query plan (22). A query rewrite processor (34) performs query transformations on the XML query. Said query transformations include transforming an expression input (60) received by an expression (62) conditional upon a set of items defined by an output (64) of the expression (62) being independent of grouping of items in the expression input (60).

11 Claims, 6 Drawing Sheets

OTHER PUBLICATIONS

Querying XML Databases; Artur Afonso de Sousa, et al.; Escola Superior de Tecnologia de Viseu, Departmento de Informatica, Portugal—Universidade do Minho, Department de Sistemas de Informacao, Guimares, Portugal; Proceedings of the XXII International Conference of the Chilean Computer Science Society- 2002 IEEE Computer Society.

Towards Declarative XML Querying; Mengchi Liu, et al.; School of Computer Science, Carleton University, Ottawa, Ontario, Canada K1S 5B6; Proceedings of the 3rd International Conference on Web Information Systems Engineering—2002 IEEE Computer Society.

Optimized Translation of XPath into Algebraic Expressions Parameterized by Programs Containing Navigational Primitives; Sven Helmer, et al.; University of Mannheim, Germany; Proceedings of the 3rd International Conference on Web Information Systems Engineering- 2002 IEEE Computer Society.

Extensible/Rule Based Query Rewrite Optimization in Starburst; Hamid Pirahesh, et al.; IBM Almaden Research Center; San Jose, CA 95120.

* cited by examiner

CONTEXT QUANTIFIER TRANSFORMATION IN XML QUERY REWRITE

BACKGROUND OF THE INVENTION

1. Field of the Invention

The present invention relates to the art of information processing. It finds particular application in processing queries applied to extensible markup language (XML) documents and to data streams of XML items, and will be described with particular reference thereto. However, the present invention is useful in reducing temporary storage usage, increasing pipelining, and improving rewrite efficiency in queries applied to tag-based markup languages generally.

2. Description of Related Art

The extensible markup language (XML) is a flexible tag-based markup language suitably used to store data for posting on the Internet or local intranets, wide area networks, or the like. XML is increasingly being used as a native language for data storage in database management systems. In these and other XML applications, it is advantageous to have a flexible XML query language for creating and modifying XML documents, for efficiently selectively retrieving data from XML documents or collections of XML documents, for sorting data, for inputting data into XML documents, and for otherwise manipulating XML items and data. Various XML query languages have been developed, including XML-QL, XQL, Quilt, and XQuery.

XML employs markup tags to classify, group, interrelate, or otherwise provide metadata regarding data stored in XML documents. An XML query can be viewed as producing streams of sequences of items. In a tabular notation using one column, each separately processed sequence comprising an XML item or a concatentation of XML items is suitably viewed as a row, while each XML item within a row is suitably viewed as an XML item, fragment, or row element. Such terminology is used herein to provide a convenient tabular visualization of the data; however, the use of such terminology does not imply that the data is stored or processed in tabular format.

In typical query processing, an XML query is constructed by a user, a software module, or the like, and is converted from a textual format to a data flow model. At the data flow model level, query rewrites of identified inefficient data flow structures are performed to optimize the data flow model. A query rewrite is a query transformation that produces a more efficient query without changing the query output. The optimized data flow model is compiled into executable instructions. Optionally, query rewriting is performed at a lower level than the data flow model, such as at the executable instructions level. It will be appreciated that the executable instructions substantially correspond to a data flow model written in a specific executable instruction set. Similarly, the query text substantially corresponds to a data flow model written in a high level text-based language, and so optionally query rewrites are performed at the text query level. Typically, however, the XML query is converted into an intermediate data flow model which formats the XML query in a manner well-suited for efficient XML query rewrite processing.

Regardless of the processing level at which query rewrites are performed, the query rewrites perform various optimization tasks such as reducing XML item sequence construction, reducing usage of memory for temporary data storage, and promoting data flow pipelining. An XML item sequence is suitably visualized as a row or tuple that contains a plurality of XML fragments or row elements. An XML item sequence involves concatenation of XML items. Sequence construction breaks the data processing pipeline because the sequence is constructed before the data is further processed. Thus, one goal of query rewriting is reduction of sequence construction.

However, sequence construction may be important in the context of a specific XML query. For example, an XML items sequence associated with an XML element constructor requires the construction of the sequence. Thus, although a sequence is generally preferably transformed into a pipelined processing data flow of single XML items using one or more query rewrite operations, heretofore query rewrite processors have not generally implemented such rewrites. The query rewrite processor has difficulty identifying under what conditions such a rewrite can be performed without corrupting the XML query, and so does not perform the rewrite.

The present invention contemplates an improved method and apparatus which overcomes these difficulties and others.

SUMMARY OF THE INVENTION

In accordance with one aspect, an XML query rewrite method is provided for processing an XML query. An expression of the XML query is identified that receives an expression input. It is determined whether a set of items defined by the output of the expression is independent of grouping of items in the expression input. The expression input is transformed into a transformed data stream input, the transforming being conditioned upon the set of items defined by the output of the expression being independent of grouping of items in the expression input.

In accordance with another aspect, an XML query compilation processor is disclosed. An execution compiler transforms an XML query into an executable XML query plan. A query rewrite processor performs query transformations on the XML query. Said query transformations include transforming an expression input received by an expression that produces an output stream of individual XML items conditional upon a set of items defined by the output stream of individual XML items being independent of grouping of items in the expression input.

In accordance with yet another aspect, an article of manufacture is disclosed, including a program storage medium encoding instructions executable by a computer. Said instructions embody a query rewrite method including: identifying an expression of an XML query having an input data stream grouped by a first quantifier and an output data stream grouped by a FOR quantifier; computing at least one evaluation property based at least on the expression and the first quantifier; and performing a selected quantifier transformation conditional upon the computed evaluation property.

Numerous advantages and benefits of the invention will become apparent to those of ordinary skill in the art upon reading and understanding this specification.

BRIEF DESCRIPTION OF THE DRAWINGS

The invention may take form in various components and arrangements of components, and in various process operations and arrangements of process operations. The drawings are only for the purposes of illustrating preferred embodiments and are not to be construed as limiting the invention.

DETAILED DESCRIPTION OF THE PREFERRED EMBODIMENTS

Figure 1:
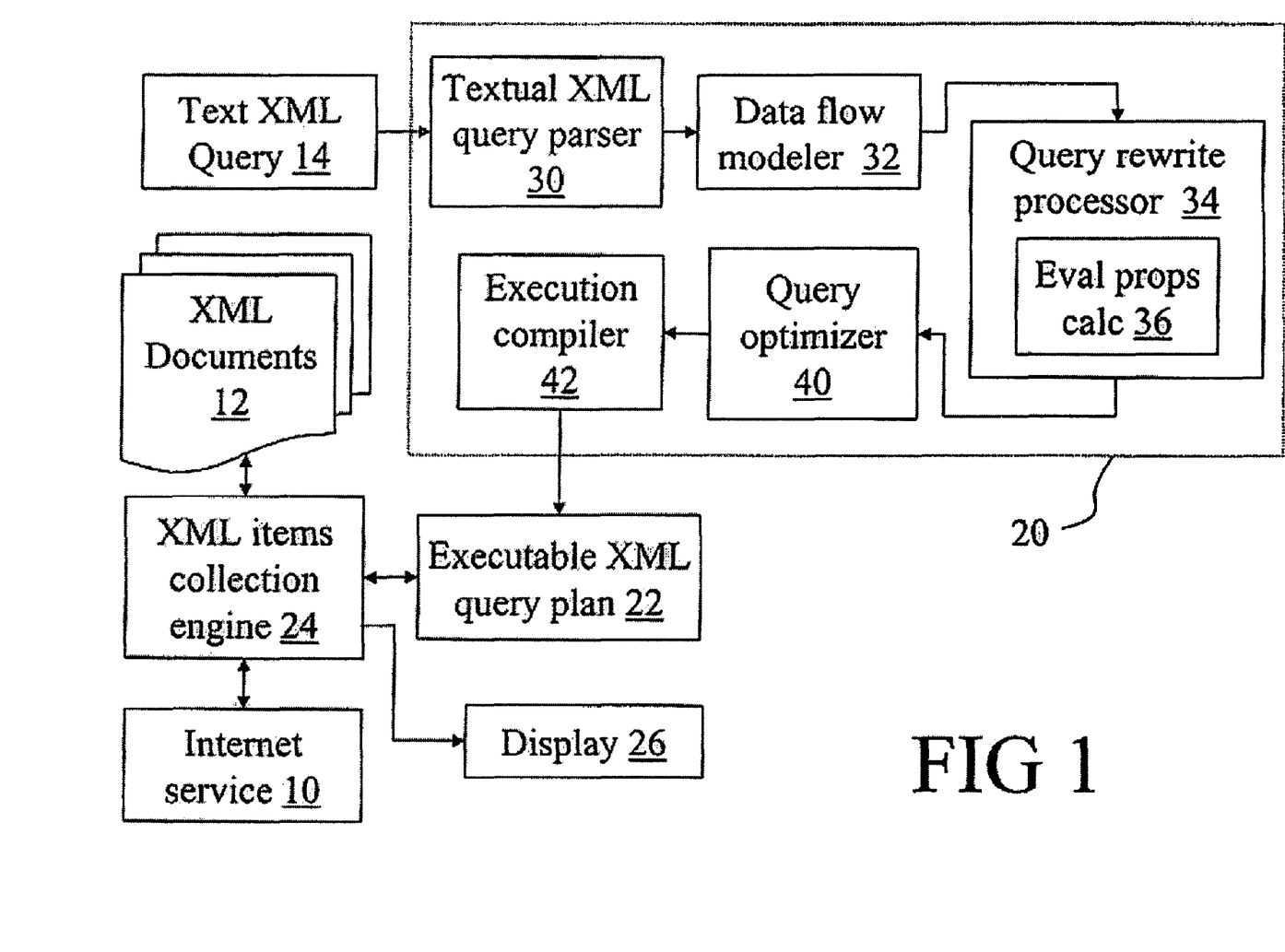
FIG. 1 shows a block diagram of an XML query processing system.

With reference to FIG. 1, a query is performed on a data stream of items of an XML data type produced by an extensible markup language (XML) source. The data stream of XML items may be extracted from an Internet service 10, from one or more XML documents 12, or from another source of XML items. Although XML documents 12 are shown in FIG. 1, the data stream processed by the query may be extracted from a document formatted in another tag-based markup language, such as a data stream of hypertext markup language (HTML) items extracted from one or more HTML documents. Similarly, the Internet service may supply a data stream of HTML items. A textual XML query 14 is constructed by a user, by an application program, or the like.

The textual XML query 14 is preferably constructed in accordance with XQuery, which is a commonly used XML query language. However, other XML query constructions can be employed in which XML documents are processed as data streams of sequences of XML fragments or XML items. In XQuery, for example, data streams of XML items and sequences of items are constructed using FLWOR expressions in which FOR clauses produce data streams of individual XML items, LET clauses produce concatenated sequences of XML items, combination of FOR and LET clauses cause a Cartesian product of the produced streams, WHERE clauses provide filtering based on predicate expressions, and the RETURN clause causes the computation of the result that is flown to a subsequent operation. The FLWOR expression is used as an example herein; other XQuery expressions also can create LET and FOR dataflow henceforth called LET and FOR quantifiers. Example data flow stream transformations are described herein with reference to the preferred XQuery syntax; however, these exemplary data flow stream transformations are readily adapted to other XML query languages that may employ different syntax, clause names, or the like for producing data streams of single XML items, concatenated sequences of XML items, or combinations thereof.

The textual XML query 14 is processed by a compilation processor 20 to produce an executable XML query plan 22, which when executed accesses the Internet service 10 to receive, sort, search, transmit, or otherwise process data content from or to the Internet service 10, accesses the XML documents 12 to store, read, sort, search, or otherwise process data content of the XML documents 12, or otherwise interacts with a source or repository of XML items.

In a read operation, an XML items collection engine 24 formats a data stream of XML items extracted from the Internet service 10, the XML documents 12, or other source of XML items into a query data model or other suitable format that is received by the executing XML query plan 22. In a write operation, the XML items collection engine 24 formats a stream of XML items output from the executing XML query plan 22 into a format suitable for receipt by the Internet service 10, for storage in the XML documents 12, or for storage or receipt by another repository of XML items. Rather than storing or transmitting the output of the executing XML query plan 22, the output can be displayed on a display 26 or otherwise communicated to a user.

More specifically, the compilation processor 20 includes various components for transforming and optimizing the textual XML query 14 to produce the executable XML query plan 22. In the exemplary illustrated embodiment, a textual XML query parser 30 parses the textual XML query 14 to produce a parsed XML query from which a data flow modeler 32 produces an equivalent data flow model. The data flow model format is convenient for performing query rewrite and optimization of the XML query prior to conversion to executable code.

The data flow model is analyzed by a query rewrite processor 34 which employs heuristic, cost-based, or other methods to identify query rewrites that improve or are likely to improve efficiency of the XML query. The query rewrite processor 34 performs identified query rewrites if it can determine that the rewrite is safe, that is, if it can determine the making the rewrite will not alter the output of the query.

Query rewrites that reduce sequence constructions are usually particularly advantageous. For example, a data producer produces exemplary rows defining a Data Stream (S1) according to:

$$i_{11} \ i_{12} \ i_{13} \quad\quad\quad\quad\quad\quad\quad\quad\quad\quad\quad\quad (S1)$$

$$i_{21} \ i_{22}$$

$$i_{31} \ i_{32} \ i_{33} \ i_{34}$$

$$i_{41}$$

where in the Data Stream (S1) the XML items are indicated by $i_{xy}$, the subscript x indexes the rows flown by the data producer, and the subscript y indexes individual XML items within each row. An XQuery LET quantifier arranges the Data Stream (S1) as a sequence according to:

$$i_{11} \ i_{12} \ i_{13} \ i_{21} \ i_{22} \ i_{31} \ i_{32} \ i_{33} \ i_{34} \ i_{41} \quad\quad (S2)$$

where the Data Stream (S2) output by the LET quantifier is a concatenated sequence of XML items represented herein as a row of XML items consistent with the tabular visualization. However, the use of such notation does not imply that the data is stored or processed in a tabular format. A table structure is one suitable format for temporarily storing the concatenated sequence; however, other formats such as delimited lists can be employed. Moreover, some expressions may process the concatenated sequence without employing temporary storage.

In the Data Stream (S1), or in the constructed concatenated sequence Data Stream (S2), each XML item $i_{xy}$ corresponds to a value or to a node. All such items $i_{xy}$ in the concatenated sequence are typically collected and stored in temporary memory before the expression that receives the sequence is evaluated. The concatenated sequence breaks pipelining of the XML items by delaying further processing until the XML items of the sequence are collected. Another disadvantage of a LET quantifier or other sequence construction quantifier is that the sequence construction corresponds to additional processing performed during execution of the XML query.

Thus, sequence construction typically imposes memory and pipelining efficiency penalties on the XML query execution, and furthermore introduces one or more additional processing operations. Because of these disadvantages, query rewrites that eliminate sequence construction quantifiers are preferably selected as candidates for data stream transformation by the heuristic or cost-based decision-making processing of the query rewrite processor 34.

For example, the LET quantifier may be advantageously transformed into an XQuery FOR quantifier that produces a data stream of individual XML items. Considering again the Data Stream (S1) flown by the exemplary row producer, a FOR transformation produces:

$i_{11}$ $i_{12}$ $i_{13}$ $i_{21}$ $i_{22}$ $i_{31}$ $i_{32}$ $i_{33}$ $i_{34}$ $i_{41}$ (S3)

where the Data Stream (S3) includes individual XML items $i_{xy}$. The FOR clause output is represented herein as a column of XML items consistent with the tabular visualization. However, the use of such notation does not imply that the data is stored or processed in a tabular format. The data stream produced by the FOR clause is preferably pipelined during evaluation of the XML query.

In XQuery, the LET quantifier performs construction of concatenated sequences of XML items, while the FOR quantifier produces data streams of individual unconcatenated XML items suitable for efficient pipelining. Hence, in XQuery, the desired data stream transformation for transforming a sequence such as the Data Stream (S2) into a data stream of individual XML items such as the Data Stream (S3) is suitably denoted as a LET-to-FOR transformation.

Although LET quantifiers are appealing candidates for quantifier transformation, the query rewrite processor cannot arbitrarily perform a LET-to-FOR transformation each time it encounters a sequence of concatenated XML items such as that produced by a LET quantifier, because in some data flows such a quantifier transformation would possibly corrupt the output of the XML query or make the XML query non-functional. For example, if the data flow model corresponding to the textual XML query 14 includes a sequence constructor, then converting the sequence of XML items into a data stream of individual XML items would be undesirable.

Although a LET-to-FOR transformation advantageously promotes pipelining and tends to reduce temporary memory usage, the FOR quantifier does imply additional processing during the execution of the XML query. Thus, the FOR quantifier may also be undesirable. In some cases, it may be advantageous to employ the data stream produced by the row producer in unmodified form. That is, the Data Stream (S1) may advantageously be employed without modification. For convenience of notation herein, usage of a data stream without quantifier modification is identified by a "REG" quantifier. The REG quantifier is not a standard XQuery quantifier name; however, the data flow model preferably supports direct use of a data stream produced by a row producer without modification. Such direct use of a data stream is suitably represented herein by the REG quantifier. In the executable XML query plan 22, the REG quantifier advantageously does not introduce any additional operations into the query execution.

A transformation that removes an imposition of a grouping of XML items corresponding to a LET quantifier so that the data stream produced by the row producer is used in unmodified form is suitably referred to as a LET-to-REG transformation. Similarly, a transformation that removes an imposition of a grouping of XML items corresponding to a FOR quantifier so that the data stream produced by the row producer is used in unmodified form is suitably referred to as a FOR-to-REG transformation. The query rewrite processor 34 preferably also advantageously performs such LET-to-REG transformations and FOR-to-REG transformations. As with the LET-to-FOR transformation, however, for certain data flows transformation to a REG-type data stream may be improper. Moreover, for some data flow configurations the LET-to-FOR transformation may be safely performed without corrupting the XML query, while the LET-to-REG transformation (or equivalently a FOR-to-REG transformation following the LET-to-FOR transformation) may be unsafe and may result in corrupted XML query performance.

The query rewrite processor 34 identifies a data stream quantifier that is indicated as being advantageously transformed. The identification can be performed heuristically, based on a cost analysis, or by another type of analysis. That is, the query rewrite processor 34 identifies a data stream for which a transformation will improve or is likely to improve the overall efficiency of the XML query. In a preferred embodiment, other transformations besides the transformations described herein are available and applied when appropriate to improve overall efficiency of the XML query. In this embodiment, the query rewrite processor 34 may also identify a data stream for which a transformation described herein is likely to enable other transformations that together improve the overall efficiency of the XML query. Similarly, other transformations provided by the query rewrite processor 34 may enable one or more of the query transformations described herein. Typically, any sequence of concatenated XML items such as that produced by an XQuery LET clause is identified as being advantageously transformed into a data stream of individual XML items such as that produced by an XQuery FOR clause, and may be further identified as being more advantageously removed altogether to produce a data stream corresponding to a REG quantifier. A FOR data stream may be identified as being advantageously transformed into a REG data stream.

Once the query rewrite processor 34 identifies a data stream that is indicated as being advantageously transformed, it examines the expression that receives the data stream to determine whether or not the conversion can be safely performed. This expression examination suitably includes analyzing the evaluation of the expression and its resulting data stream using an evaluation properties calculator 36 to compute a plurality of properties that indicate what type or types of quantifier transformations can be safely performed.

In a preferred embodiment, the evaluation properties include: a granularity property indicative of whether the set defined by the output of the expression (or, more precisely, the result of the evaluation of the expression using the input context sequence or data stream) depends upon how the XML items are grouped in the input data stream; a duplication property indicative of whether a set of different XML items in the input data stream can produce duplicate XML items in the output stream; and an ordering dependence property indicative of whether the ordering of XML items in the output is dependent upon the order of XML items in the input. Additionally, the evaluation properties calculator 36 preferably determines whether the input data stream flows exclusively to the expression under consideration or to multiple consumers, and whether all consumers of the expression output data stream are insensitive to partitioning of the input data stream.

Based on the expression properties computed by the evaluation properties calculator 36, a determination is made as to whether the data stream transformation can be safely performed. That is, a determination is made as to whether the data stream transformation can be performed without possibly corrupting the XML query by changing the result of the evaluation of the expression under consideration. In some embodiments, the data stream quantifier transformation is performed and additionally one or more processing elements are inserted into the data flow model such that the overall output of the expression plus the inserted element or elements are ensured to be unchanged versus the result of the evaluation of the expression prior to transformation.

With continuing reference to FIG. 1, the query rewrite processor 34 performs one or more query rewrite operations on the data flow model representing the XML query. Preferably, the query rewrite processor 34 operates iteratively, in that after the data flow model is analyzed and one or more query rewrite operations are performed, the analysis of the data flow model is repeated to determine whether the previous query rewrite operations have produced a transformed data flow model in which additional query rewrites are indicated. For example, in one preferred embodiment a direct LET-to-REG transformation is not performed; rather, a LET-to-FOR transformation is first performed if indicated, and on a second pass of the query rewrite processor 34 the new FOR clause is examined heuristically to determine whether a FOR-to-REG transformation is indicated. Using this two-pass transformation, the iterative heuristic analysis may advantageously identify an intermediate query rewrite operation that uses the intermediate FOR quantifier configuration to perform an additional query transformation.

Once the query rewrite processor 34 determines that further query rewrite operations are not indicated, the data flow model as modified by processing performed by the query rewrite processor 34 is input to a query optimizer 40. The query optimizer 40 performs optimizations based on a costing analysis of physical operators of the data flow model to provide greater XML query efficiency. An execution compiler 42 compiles the data flow model after optimization into the executable XML query plan 22 which is suitable for execution.

The components of the XML query compilation processor 20 are exemplary only. Those skilled in the art can readily modify the described XML query compilation processor 20 to suit specific XML query syntaxes or languages, specific applications, specific database management system configurations, and the like. For example, if the XML query is provided to the XML query compilation processor in a non-textual format rather than as the textual XML query 14, then the text parser 30 is suitably omitted.

In another contemplated embodiment, the data flow modeler 32 is omitted, in which case the query rewrite processing is suitably performed on the parsed XML query or on the executable XML query plan. Alternatively, a plurality of data flow modeling processors can be employed to implement a plurality of data flow model formats. For example, another data flow modeler is optionally inserted between the query rewrite processor 34 and the query optimizer 40 to optimize the data flow model format for processing by the query optimizer 40.

Still further, although the XML query rewrite processor 34 is shown in FIG. 1 as a separate component, it is contemplated to integrate XML query rewrite operations into the data flow modeler, to integrate the XML query rewrite processor 34 and the query optimizer 40 into a single component that performs both query rewrites and query optimization, or to otherwise modify the XML query compilation processor 20.

The compilation processor 20 is typically implemented using one or more computer programs, each of which executes under the control of an operating system, such as OS/2, Windows, DOS, AIX, UNIX, MVS, or so forth, and causes a computer (not shown) to perform the desired XML query compilation processing as described herein. Thus, using the present specification, the compilation processor 20 may be implemented as a machine, process, or article of manufacture by using standard programming and/or engineering techniques to produce software, firmware, hardware or any combination thereof.

Generally, the computer programs and/or operating system are all tangibly embodied in one or more computer-readable devices or media, such as memory, data storage devices, and/or data communications devices, thus making a computer program product or article of manufacture according to the invention. As such, the terms "article of manufacture" and "computer product" as used herein are intended to encompass a computer program accessible from any computer readable device or media.

Moreover, the computer programs and operating system are comprised of instructions which, when read and executed by one or more computers, cause said computer or computers to perform operations to implement the compilation processor 20. Under control of the operating system, the computer programs may be loaded from the memory, data storage devices, and/or data communications devices into the memories of said computer or computers for use during actual operations. Those skilled in the art will recognize many modifications may be made to this configuration without departing from the scope of the present invention.

In a preferred embodiment, the XML query data flow modeler 32 produces the data flow model equivalent of the textual XML query 14 as a query graph model. The query graph model is well known in the art and is described, for example, in Pirahesh et al., "Extensible/Rule Based Query Rewrite Optimization in Starburst," *Proceedings of ACM SIGMOD '92 International Conference on Management of Data*, San Diego, Calif., U.S.A., 1992, and in U.S. Pat. No. 5,987,455 issued to Cochrane et al. A query graph model represents sub-query operations, such as SELECT, in "boxes." Interconnections such as arcs or edges between the boxes define the relationships between different items of data from different sub-query operations. When a query is represented by a query graph model, each operation of the query is suitably graphically represented by a box having a body and a head or output expression. For each box, the head of the box describes the output data stream produced by the operation, and the body specifies the operation that computes the output from data flowing into the body. The head of the box specifies each output, and includes data types, output ordering, and other information pertaining to the output data stream. When there is an edge between two boxes, the box where the edge originates is referred to as the row producer, and the box to which the edge points to is referred to as the consumer.

In XQuery, FLWOR expressions are used to support iteration and binding of variables to intermediate results for computing joins between two or more documents, for restructuring and sorting of data, and so forth. A select box may contain the binding quantifiers of a FLWOR expression. In some cases, such as where the expression includes an 'order by' clause, additional query graph model components may be included to model the expression. Every FOR or LET binding is represented by a FOR- or LET-quantifier which ranges over a query graph model portion that represents the expression the variable is bound to. For instance, nested FLWOR expressions are expressed by nested FLWOR boxes while expressions are suitably represented by a TFEVAL (evaluation table function). WHERE predicates of the FLWOR expression are represented by predicates of the SELECT box, and the RETURN expression is represented by a head expression associated with the SELECT box.

Figure 2:
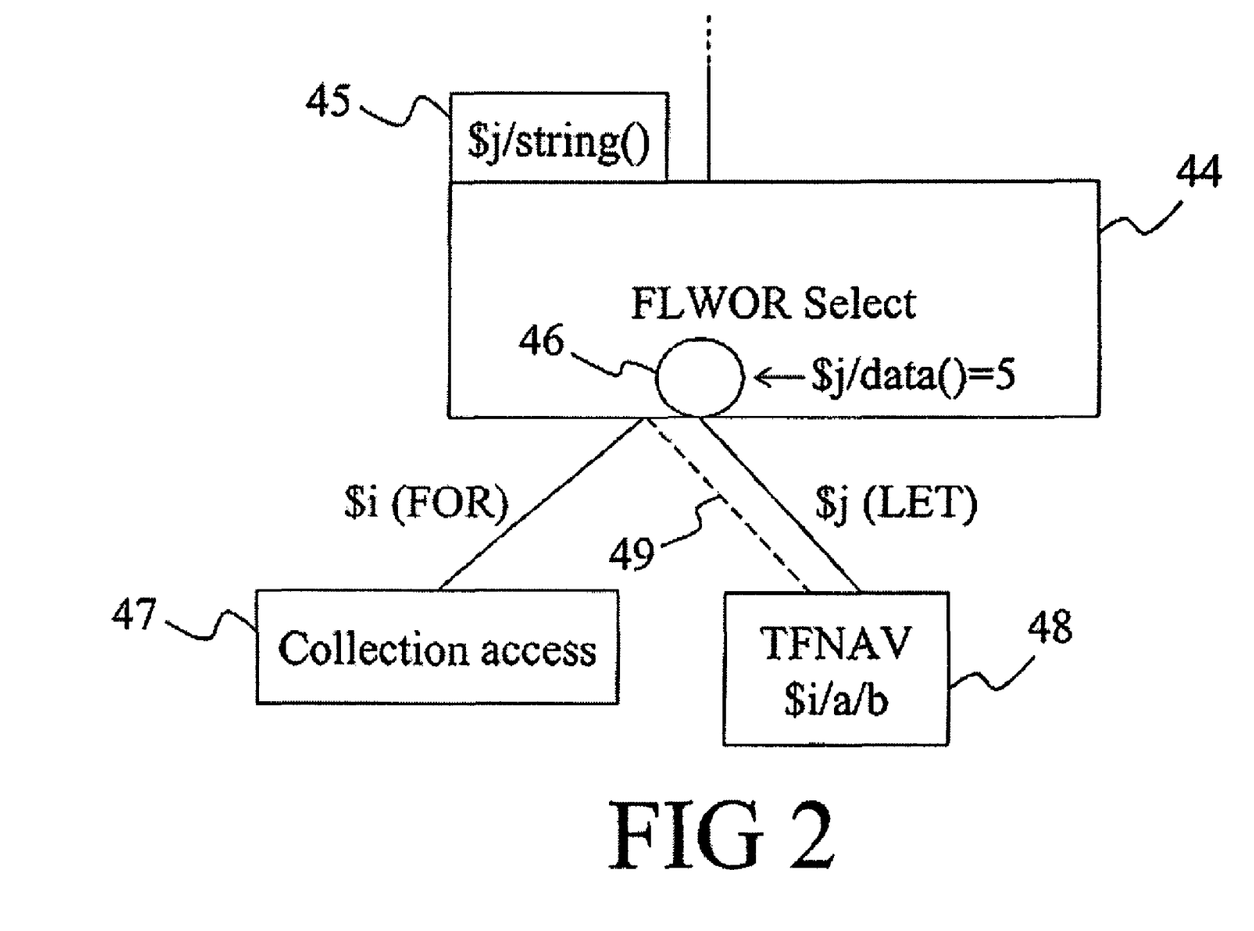
FIG. 2 shows a query graph model representation of an XQuery FLWOR expression.

With reference to FIG. 2, for example, the following XQuery code portion:
for $i in collection(URI)
let $j in $i/a/b
where $j/data( )=5
return $j/string( )

is represented by a query graph model portion shown in FIG. 2, which includes a SELECT box 44, a RETURN head expression 45 containing the return expression "$j/string( )", and a predicate 46 represented by a circle contained within the SELECT box 44 and representing the predicate expression "$j/datao( )=5". A FOR-quantifier which connects the collection access box 47 and the FLWOR-box 44 performs the FOR binding, while a LET-quantifier which connects the TFEVAL box 48 and the FLWOR-box 44 performs the LET binding using a correlation 49 corresponding to the FOR quantifier.

The query graph model has been found to be particularly advantageous for efficiently performing XML query rewrites and optimizations. However, other data flow models can be employed. Moreover, the data flow modeler 32 is optionally omitted, in which case query rewrites and optimization are performed at the textual XML query level, at the executable XML query plan level, or at an intermediate point in the compilation process.

Certain evaluation properties preferably relate the evaluation to the surrounding data flow environment. The term current expression is used herein to designate the expression (exp) of interest. The current expression refers to or receives a context quantifier based on input data stream I. The evaluation of exp based on the data stream I yields an output data stream O of sequences of XML items.

Other terms used herein include duplicate-free and selected ordering. A sequence is duplicate-free if no item occurs more than once in the sequence. The selected ordering can be any desired ordering such as document-order, which can be reconstructed by a sort operation.

In a preferred embodiment, the evaluation properties calculator 36 computes an evaluation property P0 as follows:

With O defined as $$O \stackrel{def}{=} \underset{p \ in P(I)}{STREAM}(EVAL(exp, p))$$

where:
1. STREAM constructs a stream, that is a sequence containing other sequences as their elements;
2. exp is an expression;
3. I is the context data stream produced by a stream producer, defined as a sequence whose contained elements are sequences themselves;
4. EVAL is a function or operator that evaluates the expression exp using an input context sequence and returns XML items in the selected ordering and duplicate-free; and
5. P(I) denotes a partitioning of the input context stream I, and is represented by a sequence whose contained elements are sequences themselves.

I is received by the expression as defined by the partitioning P(I). The parameter p represents sequences which are elements of P(I). The output data stream O is also called the result stream of the evaluation of exp for the entirety of the context input stream I under the given partitioning P(I). The query transformation may change the grouping of XML items in O.

The evaluation property P0 is satisfied if and only if all consumers of O are not sensitive to the grouping of XML items in O.

For example, the context quantifier suitably produces a data flow corresponding to a LET, FOR, or REG operator. Another quantifier called herein the current quantifier flows the results of the current expression. That is, the operation that evaluates the current expression is the row producer that produces the data flown by the current quantifier. Property P0 is true if the current quantifier is marked to be a FOR-quantifier. If the current quantifier is not marked to be a FOR-quantifier, then determination of whether or not the evaluation property P0 holds is more complex and context-dependent.

Prior to the transformation, the context quantifier is preferably not a REG quantifier. Also, the current quantifier is preferably a FOR-quantifier, although the current quantifier can be of another type if the property P0 is satisfied. Moreover, the context and current quantifiers are assumed to flow one column each of type XML-data type, where the XML data-type represents sequences of XML items. In the transformations described herein, the context quantifier is assumed not to be used by another expression besides the current expression. That is, it is assumed that there is one consumer. If there are multiple consumers, the expression property P0 is evaluated with respect each consumer, and the transformation under consideration may be suitable if P0 is satisfied for all consumers.

Considering a LET-to-FOR transformation, if the expression property P0 is satisfied for all consumers, then the evaluation properties calculator 36 computes additional evaluation properties P1F, P2F, and P3F as follows:

$$\text{SET}(\text{EVAL}(\exp, \text{LET}(I))) = \text{SET}\left(\underset{i \text{ in } LET(I)}{\text{CONCAT}}(\text{EVAL}(\exp, i))\right) \quad (P1F)$$

$$\forall i, j \text{ in LET}(I) \text{ with POSITION}(\text{LET}(I), i) \neq \quad (P2F)$$
$$\text{POSITION}(\text{LET}(I), j) \text{ holds SET}(\text{EVAL}(\exp, i)) \cap$$
$$\text{SET}(\text{EVAL}(\exp, j)) = \{\}$$

$$\forall i, j \text{ in LET}(I) \text{ holds POSITION}(\text{LET}(I), i) < \quad (P3F)$$
$$\text{POSITION}(\text{LET}(I), j) \Rightarrow \neg \exists e_i \text{ in EVAL}(\exp, i),$$
$$e_j \text{ in EVAL}(\exp, j) \text{ such that } e_i \gg e_j$$

where in the expressions for properties P1F, P2F, and P3F, the following notation is employed:
1. exp is an expression,
2. I is the context data stream produced by a stream producer, defined as a sequence whose contained elements are sequences themselves,
3. i,j are XML items; $e_i, e_j$ are XML items which are the result of an evaluation
4. EVAL is a function or operator that evaluates expression exp using an input context sequence and returns XML items in the selected ordering and duplicate-free,
5. CONCAT is a concatenation function or operator that constructs a sequence out of sequences of XML items,
6. LET results in the flattening of a given stream, that is $$\text{LET}(I) = \underset{p \text{ in } I}{\text{CONCAT}}(p).$$

7. LET(I) represents the context input stream that is received by exp.
8. SET is a function or operator that removes duplicates and the order of elements of the input sequence that is passed to it; it is substantially a set constructor,
9. POSITION is a function or operator returning the ordinal position of an element within a sequence,
10. >>denotes a predicate on items such that i>>j is true if and only if i and j are items and i occurs after j in the selected ordering, and
11. {} denotes an empty set.

In the properties P1F, P2F, P3F, notation generally consistent with XQuery is employed. The property P1F is a granularity or grouping property, property P2F is a duplication property, and property P3F is an ordering dependence property. A true value for granularity property P1F indicates that the set of XML items defined by the result of the evaluation of the expression exp using the concatenated sequence LET(I) as implied by the LET-quantifier remains unchanged if the items in the input data stream I are regrouped according to a FOR-quantifier. A true value for duplication property P2F indicates that for each unique XML item in the context sequence LET(I) the expression outputs a sequence of unique XML items; that is, there are no duplicates between any two output sequences. A true value for the ordering dependence property P3F indicates that the ordering of XML items in the input context sequence I induces a corresponding ordering between XML items of any two output sequences resulting from the evaluation of the expression that follows the selected ordering.

In the case of a transformation to a data stream of the REG type, the properties P1F, P2F, and P3F are replaced by generally more stringent property requirements P1R, P2R, and P3R as follows:

For a given partition P(I) holds $$(i) \text{ SET}\left(\underset{p \text{ in } P(I)}{\text{CONCAT}}(\text{EVAL}(\exp, p))\right) = \text{SET}\left(\underset{p \text{ in } I}{\text{CONCAT}}(\text{EVAL}(\exp, p))\right),$$

(ii) $\underset{p \text{ in } P(I)}{\text{CONCAT}}(\text{EVAL}(\exp, p))$ is duplicate-free, and (iii) the XML items in $$\underset{p \text{ in } P(I)}{\text{CONCAT}}(\text{EVAL}(\exp, p))$$

are in the selected ordering. (P1R)

$$\forall p_i, p_j \text{ in } I \text{ holds SET}(\text{EVAL}(\exp, p_i)) \cap \text{SET}(\text{EVAL} \quad (P2R)$$
$$(\exp, p_j)) = \{\}$$

$\forall p_i, p_j$ in I:

$p_i$ occurs before $p_j$ in I $$\Rightarrow \neg \exists e_i \text{ in EVAL}(\exp, p_i), e_j \text{ in EVAL}(\exp, p_j) \text{such that } e_i \gg e_j \quad (P3R)$$

where the notation employed in writing P1F, P2F, and P3F is again used. In addition, the following notations are employed:
1. P(I) denotes a partitioning of the input context stream I. It is represented by a sequence whose contained elements are sequences themselves. The input context stream I is received by the expression as defined by this partitioning.
2. $p, p_i, p_j$ represent sequences which are elements of P(I) or of I respectively
3. k denotes an XML item In the case of evaluation properties P1R, P2R, P3R, the context input stream P(I) which is based on the context data stream I can be either a concatenated sequence of XML-items such as that produced by a LET quantifier (LET-to-REG transformation, where P(I) contains exactly one sequence including all XML items contained in LET(I)) or a data stream of individual XML items such as that produced by a FOR quantifier (FOR-to-REG transformation, where P(I) contains exactly one sequence per XML-item contained in LET(I)). In the latter case, the property P3R considers the XML items in the order of occurrence in the FOR data stream. P1R is split into three sub-properties (i), (ii), (iii). Sub-property (i) of P1R is always enforced; however, sub-properties (ii) and (iii) may or may not be enforced depending upon the context. Sub-property (ii) of P1R is enforced if a duplicate-free output sequence is of importance, which is determined by examining the consumer of the expression. In query graph model, this is captured by a distinctness property. The sub-property (iii) of P1R is enforced if an ordering of the output sequence is of importance, again determined by examining the consumer of the expression.

The properties P1F or P1R along with the property P0 determine whether a transformation described herein is suitable. The property P0 and the appropriate property P1F or P1R is evaluated for each consumer. If these properties are satisfied for every consumer, then a transformation may be suitable. However, aspects of the transformation are further determined by the evaluation of the properties P2F, P3F or P2R, P3R. These properties indicate whether additional correction should be performed in implementing the transformation. Specifically, the property P2F or P2R indicates whether a duplications correction is needed, while the property P3F or P3R indicates whether an ordering correction is needed. The properties P2F, P3F or P2R, P3R are evaluated for each consumer, and the corrections are applied on a per-consumer basis. For example, one consumer may need a duplications correction, while another consumer may be unaffected by duplications and thus needs no correction. If the consumer requires data in document order, for instance, the current quantifier may be corrected by an ordering correction that sorts on document order before flowing data to that consumer.

Figure 3:
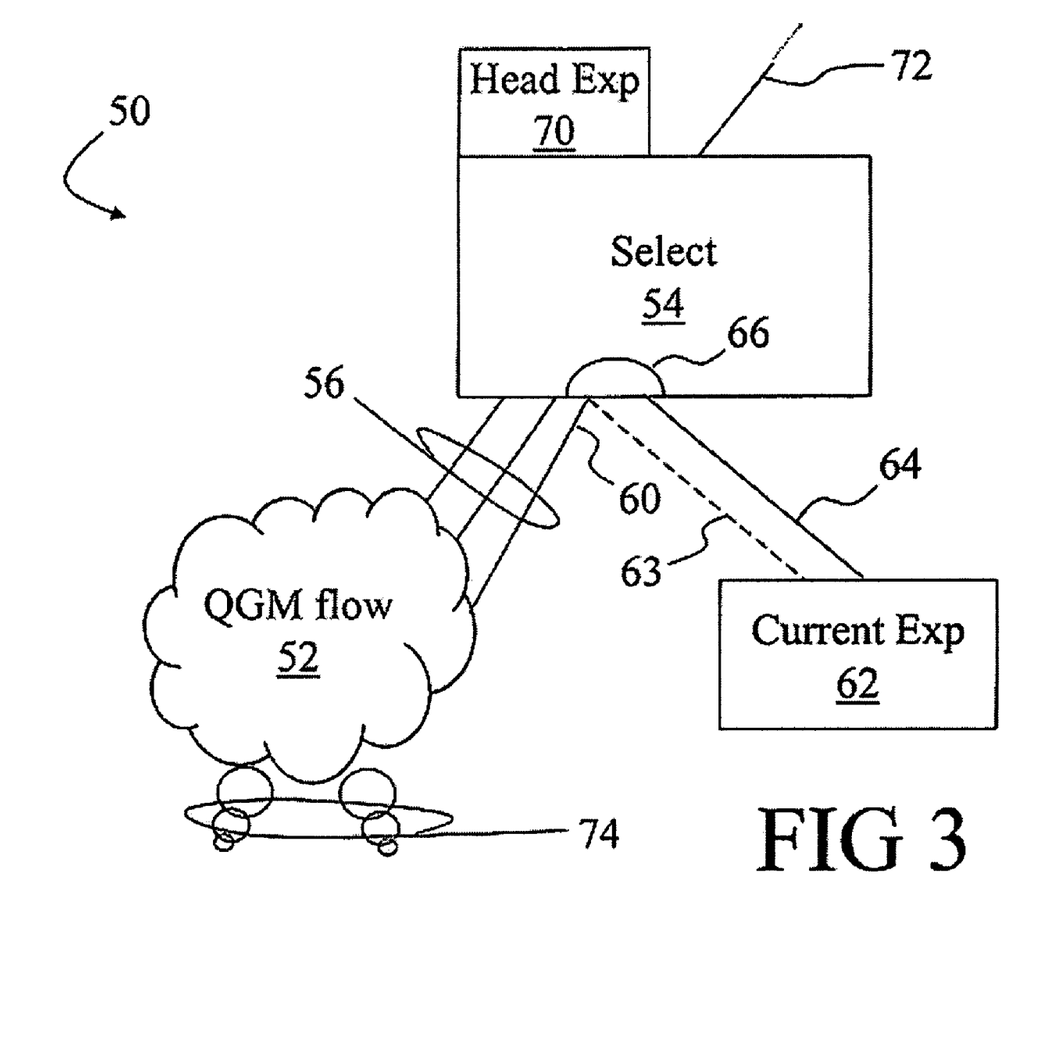
FIG. 3 shows a query graph model portion having a context quantifier that is a candidate for quantifier transformation.

With reference to FIG. 3, one suitable context quantifier transformation is described. FIG. 3 shows an exemplary query graph model portion 50 including a query graph model flow portion 52 which represents data flow portions below a context box 54, which is an exemplary SELECT box in FIG. 3. The query graph model flow portion 52 flows one or more data flow quantifiers 56, specifically three quantifiers 56 in FIG. 3. The one or more data flow quantifiers 56 include a quantifier 60 of interest which is the context quantifier 60. A current expression 62 directly underneath the context box 54 receives a correlation 63 corresponding to the context quantifier 60. For example, the current expression 62 can be embodied by a table function (TFEVAL) box that evaluates the current expression.

An output 64 of the current expression 62 flows to the context box 54. The output 64 is identified as the current quantifier 64. Optionally, the context box 54 contains one or more predicates 66. The WHERE clause in XQuery is suitably represented by predicates 66. Optionally, the context box 54 also has a head or output expression 70. In XQuery, the head or output expression 70 suitably corresponds to a RETURN clause. The context box 54 typically produces a quantifier output 72 that communicates with other portions of the query graph model (not shown). Similarly, the query graph model flow portion 52 optionally includes one or more leaves 74, specifically two leaves 74 in exemplary FIG. 3, that communicate with other portions of the query graph model (not shown).

If the context quantifier 60 produces a concatenated sequence of XML items such as that produced by an XQuery LET clause, then it is a candidate for transformation to a FOR quantifier. To determine whether a LET-to-FOR transformation can be safely performed, the evaluation properties P1F, P2F, P3F are determined for the current expression 62 and its associated context quantifier. If properties P1F, P2F, P3F are all true, then the LET-to-FOR transformation can be safely performed.

Similarly, if the context quantifier 60 produces individual XML items such as the data stream produced by an XQuery FOR clause, then it is a candidate for transformation to a REG quantifier. To determine whether a FOR-to-REG transformation can be safely performed, the evaluation properties P1R, P2R, P3R are determined for the current expression 62 and its associated context quantifier. If properties P1R, P2R, P3R are all true, then the FOR-to-REG transformation is suitably performed.

It will be appreciated that if the context quantifier 60 is a LET quantifier and if properties P1F, P2F, P3F are all true so that a LET-to-FOR transformation is performed, then in a subsequent pass of the query rewrite processor 34 the newly formed FOR quantifier may then be a candidate for a FOR-to-REG transformation. If the properties P1R, P2R, P3R are all true, then the FOR-to-REG transformation is performed. Thus, in two passes a LET-to-REG transformation is effected. In another embodiment, the properties P1R, P2R, P3R are evaluated first for the LET quantifier, and if properties P1R, P2R, P3R are all true, a direct LET-to-REG transformation is performed.

Suitable exemplary pseudocode for determining whether to perform the quantifier transformation in accordance with the properties P1F, P2F, P3F, P1R, P2R, P3R is given below:

```
if(for all consumers in the context of the current quantifier property
    P0 is satisfied)
{
    if(for all consumers the evaluation of the corresponding expression
        using the input sequence flown by context quantifier qun
        satisfies properties P1R, P2R, P3R)
    {
        call morph(qun, REG);
    }
    else if( for all consumers the evaluation of the corresponding
            expression using the input sequence flown by context
            quantifier qun satisfies properties P1F, P2F, P3F)
    {
        call morph(qun, FOR);
    }
}
procedure morph(qun: quantifier, morphTo: qunType)
{
    if(emptySequence on empty behavior is compatible if qun
    gets morphed)
    {
        morph qun into morphTo;
    }
}
```

In procedure morph, the outermost if statement requires that the property P0 be satisfied for the transformation to be performed. In one embodiment, the outermost if statement is performed only if the current quantifier is of type FOR, in which case the property P0 is known to be satisfied. The argument of the if statement testing for the compatibility of a transformation in conjunction with emptySequence on empty behavior is preferably replaced by specific code for e.g. addressing the situation where the quantifier being transformed needs to flow an empty sequence in case the subquery produces no data at all.

For example, in XQuery, flowing an empty sequence via a FOR clause produces no output, while flowing an empty sequence via a LET clause produces an empty sequence. Hence, in a LET-to-FOR transformation, a check for an empty sequence is preferably performed. The if . . . else if construction requires that the properties P1R, P2R, P3R be satisfied for a transformation to a REG type quantifier, and if P1R, P2R, P3R are not satisfied requires that P1F, P2F, P3F be satisfied for a LET-to-FOR transformation. In the above pseudocode, the duplication and ordering properties P2R, P3R or P2F, P3F are required to be satisfied for every consumer; no transformation is provided in cases where duplication or ordering correction is needed for one or more consumers.

Figure 4:
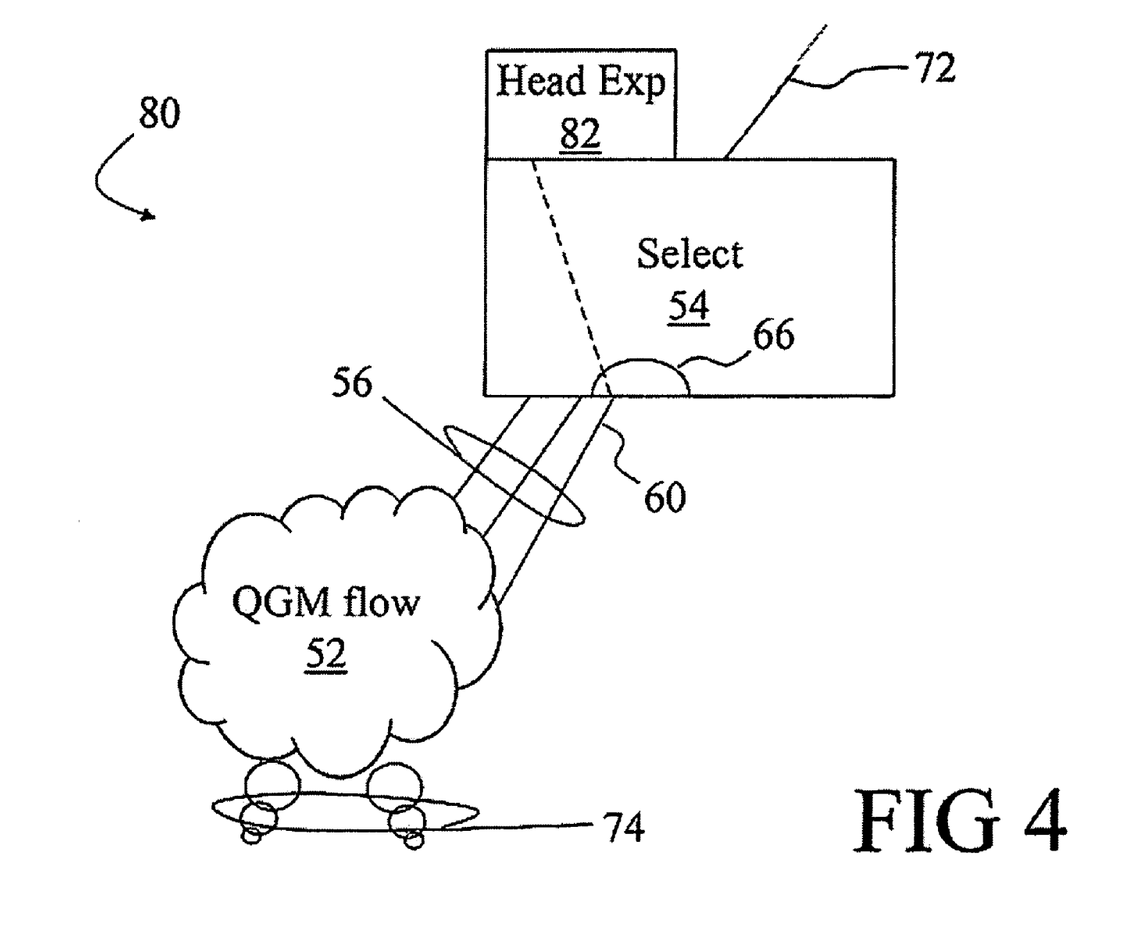
FIG. 4 shows another query graph model portion having a context quantifier that is a candidate for quantifier transformation.

With reference to FIG. 4, another exemplary query graph model portion 80 is shown. The query graph model portion 80 includes many of the same elements as the query graph model portion 50, and corresponding components are indicated by corresponding reference numerals. The query graph model portion 80 differs from the query graph model portion 50 in that rather than having the current expression 62 directly underneath the context box 54, in the query graph model portion 80 a current expression 82 is the head or output expression of the context box 54.

Figure 5:
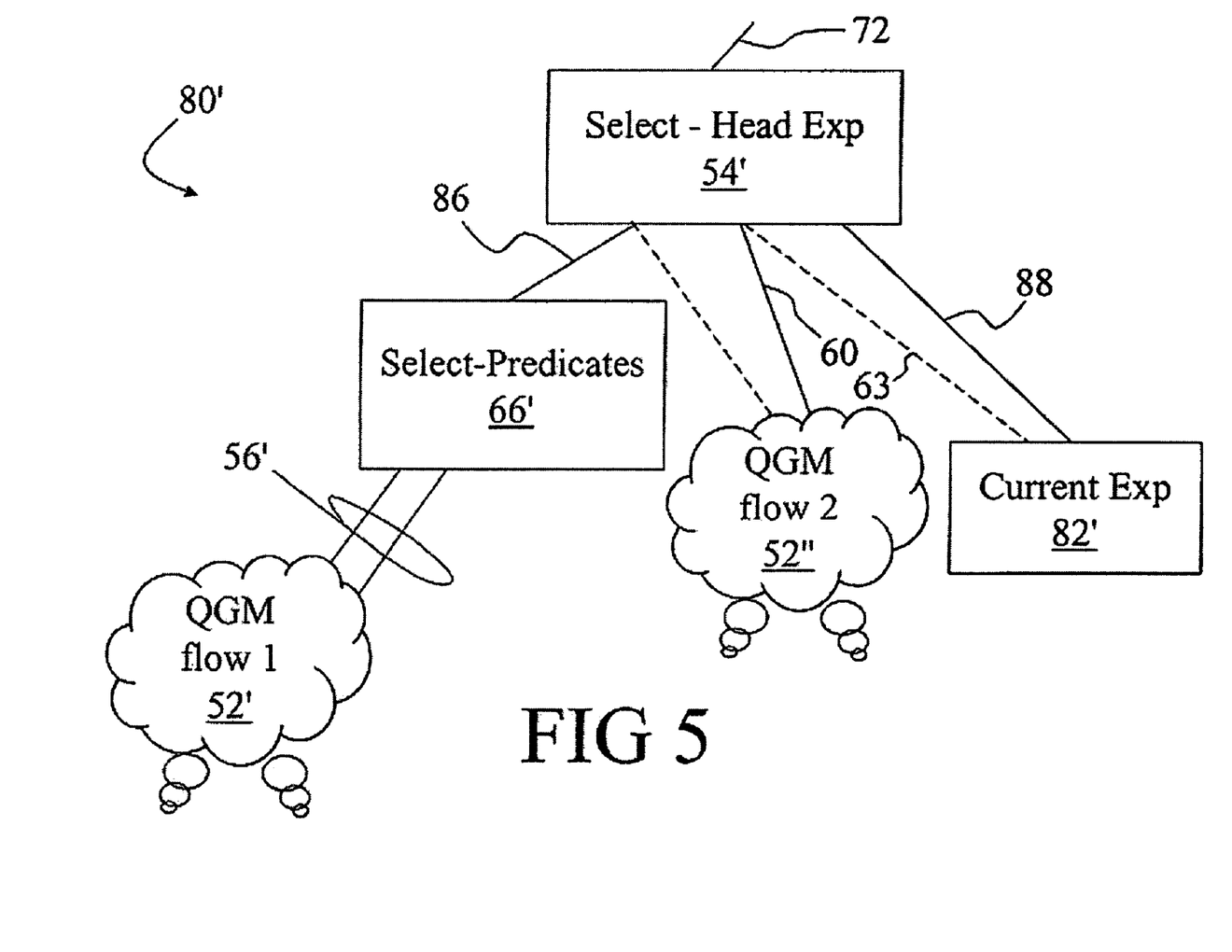
FIG. 5 shows a transformed query graph model portion that is functionally equivalent to the query graph model portion shown in FIG. 5, in which the transformation facilitates quantifier transformation.

With reference to FIG. 5, a query graph model portion 80' is shown, which is transformed but functionally equivalent to the query graph model portion 80 of FIG. 4. In the query graph model transformation, the query graph model flow portion 52 is broken into two query graph model flow portions 52', 52". A new box 66' separately performs the predicates 66, if predicates 66 were included in the query graph model portion 80. The query graph model flow portion 52" receives a correlation of a REG quantifier 86 flowing out of the context box 66' that contains data necessary to evaluate the query graph model flow portion 52". The query graph model flow portion 52" outputs the context quantifier 60. A correlation 63 corresponding to the context quantifier 60 is received by the current expression 82', which is reformulated as a separate box.

Comparison of FIG. 5 with FIG. 3 shows that the elements 52", 54', 82' of the transformed query graph model 80' correspond to the elements 52, 54, 62, respectively, of the transformed query graph model 80'. Thus, in the transformed query graph model portion 80' the context quantifier 60, the current expression 82', and a current quantifier 88 flowing out of the current expression 82' are suitably identified. LET-to-FOR, FOR-to-REG, or LET-to-REG quantifier transformations can be performed on the context quantifier 60 dependent upon the type of the context quantifier 60 and the evaluation properties P1F, P2F, P3F, P1R, P2R, P3R of the current expression 82' and the context quantifier 60.

Figure 6:
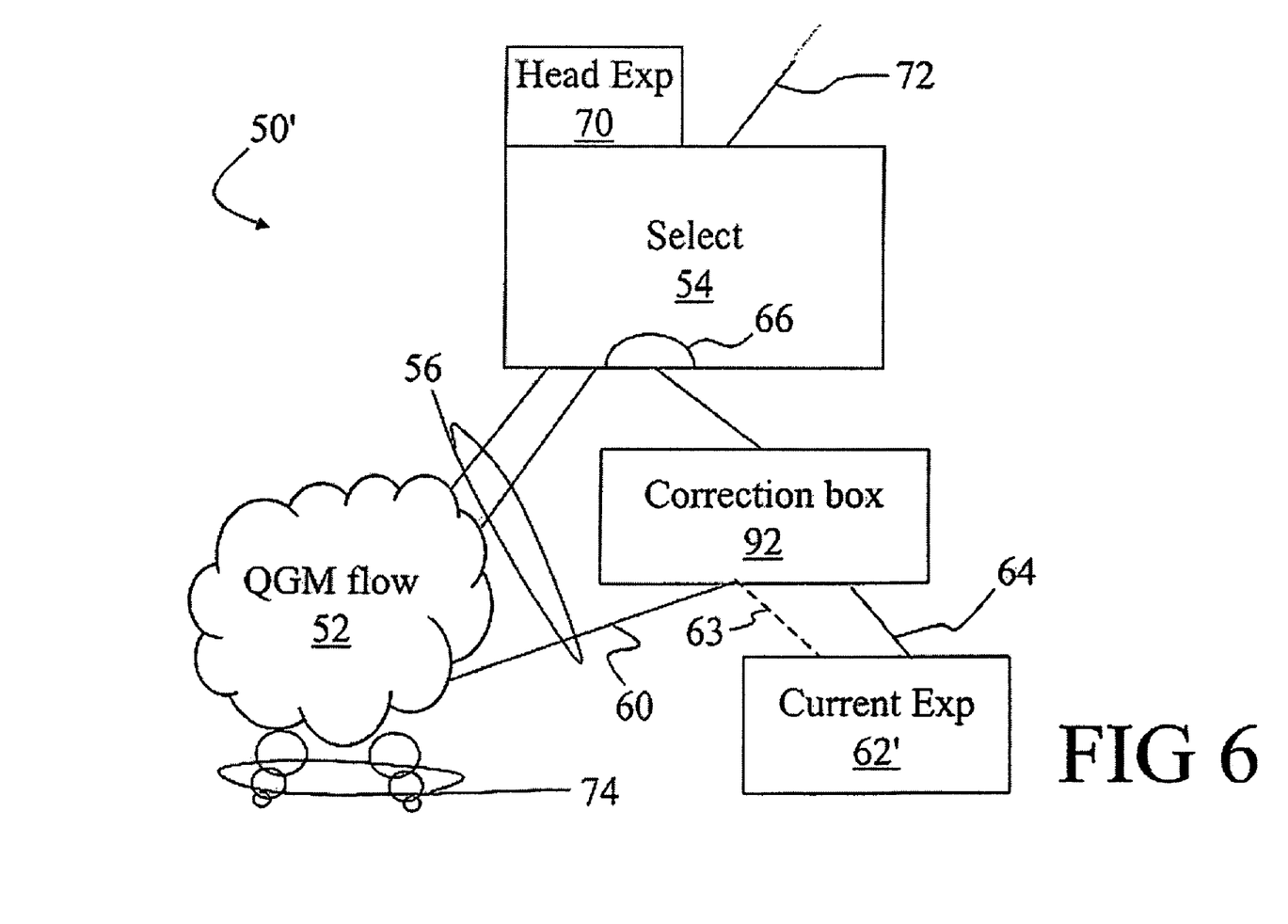
FIG. 6 shows a transformed query graph model portion that is functionally equivalent to the query graph model portion shown in FIG. 3, in which a new box is inserted to compensate for a context quantifier transformation.

With reference to FIG. 6, yet another exemplary query graph model portion 50' is shown, which is a transformation of the query graph model 50 shown in FIG. 3 in a case where the current expression 62 that satisfied P1F, P2F, P3F (for a transformation to FOR) or P1R, P2R, P3R (for a transformation to REG) is replaced by a current expression 62' that satisfies P1F but fails one of P2F or P3F (for a transformation to FOR) or that satisfies P1R but fails one of P2R or P3R (for a transformation to REG).

Because one of the duplication property (P2F or P2R) or the ordering dependence property (P3F or P3R) is not satisfied, the quantifier transformation cannot be performed without the possibility that the output of the expression 62 may be altered. However, as shown in FIG. 6, such a quantifier transformation can be safely performed if it is accompanied by insertion of a correction box 92. In the case where the duplication property (P2F or P2R) failed, the correction box 92 removes any duplicate XML items from the current quantifier stream 64. In the case where the ordering dependence property (P3F or P3R) failed, the correction box 92 sorts XML items of the current quantifier stream 64. Suitable exemplary pseudocode for performing the quantifier transformation and inserting the correction box 92 into the query graph model if it is needed (that is, if one of P2F or P3F or one of P2R or P3R is not true) is given below:

```
if(for all consumers in the context of the current quantifier property
    P0 is satisfied)
{
    if(for all consumers the evaluation of the corresponding expression
        using the input sequence flown by context quantifier qun
        satisfies sub-property (i) of property P1R for all consumers,
        and also satisfies sub-property (ii) and/or sub-property (iii)
        of P1R, if employed, for all consumers)
    {
        for (each consumer)
        {
                let exp=(the current expression according to the current
                                consumer)
                call morph(qun, exp, REG);
        }
    }
    else if( for all consumers the evaluation of the corresponding
                expression using the input sequence flown by context
                quantifier qun satisfies property P1F for all consumers)
    {
        for (each consumer)
        {
                let exp=(the current expression according to the current
                                consumer)
                call morph(qun, exp, FOR);
        }
    }
}
procedure morph(qun: quantifier, exp: expression, morphTo: qunType)
{
    local p2, p3: propertyType;
    local expQun: quantifier;
    local newBox: box;
    p2 := (morphTo == REG)? P2R: P2F;
    p3 := (morphTo == REG)? P3R: P3F;
    expQun := quantifier that flows the result of exp (i.e. the current
                quantifier in the global context);
    if(emptySequence on empty behavior is compatible if qun
    gets morphed)
    {
        morph qun into morphTo;
        if(evaluation of exp using input sequence flown by qun
            does not satisfy either property p2 or p3 for any consumer)
        {
            create a new SELECT box newBox;
            make it range over both qun and expqun;
            make it output the data flown by expqun;
            create a new REG-quantifier contained by the context box;
                let it range over the new SELECT box and let it flow
                the output of newBox;
            if(evaluation of exp using input sequence flown by qun
                does not satisfy property p2 for a given consumer)
            {
                mark newBox for the consumer to remove duplicates;
            }
            if(evaluation of exp using input sequence flown by qun
                does not satisfy property p3 for a given consumer)
            {
                impose order requirement for the consumer on the
                output of newBox;
            }
        }
    }
}
```

In this pseudocode, the if . . . else if construct requires only that property P1R or alternatively property P1F be satisfied for each consumer to perform the transformation. The if statements of procedure morph that apply the newBox component or components perform duplication correction or ordering correction on a per-consumer basis as needed. Thus, the duplication property P2R or P2F is evaluated for each consumer and, if the property is not satisfied for a consumer, then a suitable de-duplicating newBox is inserted for that consumer. Similarly, the ordering dependence property P3R or P3F is evaluated for each consumer and, if the property is not satisfied for a consumer, then a suitable ordering newBox is inserted for that consumer.

It will be appreciated that the correction box 92 requires employment of temporary memory, sequence construction, or both to identify and remove duplicates or to perform the sorting. Hence, the transformation described with reference to FIG. 6 does not directly improve pipelining. Nonetheless, the heuristic or cost-based analysis of the XML query performed by the query rewrite processor 34 may indicate a likelihood that the transformation described with reference to FIG. 6 will enable a subsequent pass of the query rewrite processor 34 to perform another query rewrite operation. The transformation described with reference to FIG. 6 coupled with another query rewrite operation collectively may improve overall efficiency of the XML query.

The query processing described with reference to FIG. 1, the query graph model notation described with reference to FIG. 2, and the quantifier transformations described with reference to FIGS. 3 through 6 are exemplary only. Those skilled in the art can readily adapt the described query processing, query graph model notation, and quantifier transformations for specific applications.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, what is claimed is:

1. An XML query rewrite method processing an XML query, the XML query rewrite method comprising:
identifying an expression of the XML query that receives a sequence of concatenated XML items as an expression input;
determining of whether a set of items defined by an output of the expression is independent of grouping of items in the expression input by determining a granularity property according to:

$$\text{SET}(\text{EVAL}(exp, \text{LET}(I))) + \text{SET}\left(\underset{i \text{ in } LET(I)}{\text{CONCAT}(\text{EVAL}(exp, i))}\right)$$

where exp represents the expression, I represents the sequence of concatenated XML items, CONCAT is a concatenation operator, EVAL is an expression evaluation operator, SET is a set operator, LET produces a concatenated sequence of XML items, and wherein the set of items defined by the output of the expression is determined to be independent of grouping of items in the expression input if the granularity property is true; and
transforming the expression input into a transformed data stream input, the transforming being conditioned upon the set of items defined by the output of the expression being independent of grouping of items in the expression input.

2. The XML query rewrite method as set forth in claim 1, wherein the transforming of the expression input into a transformed data stream input comprises:
transforming the sequence of concatenated XML items into a data stream of individual unconcatenated XML items.

3. The XML query rewrite method as set forth in claim 1, further comprising:
determining a duplication property according to:
$\forall i,j$ in LET(I) with POSITION(LET(I),i)≠POSITION (LET(I),j) holds SET(EVAL(exp,i))∩SET(EVAL(exp, j))={ }, and
determining an ordering dependence property according to:
$\forall i,j$ in LET(I) holds
POSITION(LET(I),i)<POSITION(LET(I),j)
⇒¬∃$e_i$ in EVAL(exp,i),$e_j$ in EVAL(exp,j) such that $e_i >> e_j$,
wherein POSITION returns ordinal position of an element within a sequence, and the transforming is further conditioned upon the duplication property being true and upon the ordering dependence property being true.

4. An XML query rewrite method processing an XML query, the XML query rewrite method comprising:
identifying an expression of the XML query that receives an expression input;
determining of whether a set of items defined by an output of the expression is independent of a grouping of items in the expression input by determining a granularity property including at least:

$$\text{SET}\left(\underset{p \text{ in } P(I)}{\text{CONCAT}(\text{EVAL}(exp, p))}\right) = \text{SET}\left(\underset{p \text{ in } I}{\text{CONCAT}(\text{EVAL}(exp, p))}\right)$$

where exp represents the expression, I represents the expression input, CONCAT is a concatenation operator, EVAL is an expression evaluation operator, P(I) denotes a partitioning of the expression input I, and SET is a set operator, and wherein the set of items defined by the output of the expression is determined to be independent of grouping of items in the expression input if the granularity property is true; and
transforming the expression input into a transformed data stream input, the transforming being conditioned upon the set of items defined by the output of the expression being independent of grouping of items in the expression input.

5. The XML query rewrite method as set forth in claim 4, wherein the transforming of the expression input into a data stream input comprises:
removing an imposition of a grouping of XML items corresponding to a quantifier that imposes a selected grouping of XML items on the expression input.

6. The XML query rewrite method as set forth in claim 5, wherein the XML query is an XQuery, and the removing of an imposition of a grouping of XML items corresponding to a quantifier comprises:
removing an imposition of a grouping of XML items corresponding to a quantifier selected from a group consisting of an XQuery LET quantifier and an XQuery FOR quantifier.

7. The XML query rewrite method as set forth in claim 4, further comprising:
determining a duplication property according to:
$\forall p_i, p_j$ in I holds SET(EVAL(exp,$p_i$))∩SET(EVAL(exp, $p_j$))={ }
and determining an ordering property according to:
$\forall p_i, p_j$ in I:
$p_i$ occurs before $p_j$ in I
⇒¬∃$e_i$ in EVAL(exp, $p_i$), $e_j$ in EVAL(exp, $p_j$) such that $e_i >> e_j$ wherein the transforming is further conditioned upon the duplication property being true and upon the ordering dependence property being true.

8. An article of manufacture including a program storage medium storing instructions executable by an associated computer, the instruction embodying an XML query compilation processor comprising:
an execution compiler transforming an XML query into an executable XML query plan; and
a query rewrite processor is performing query transformations on the XML query, said query transformations including transforming an expression input received by an expression that produces an output stream of individual XML items conditional upon a set of items defined by the output stream of individual XML items being independent of grouping of items in the expression input and being adapted to perform the expression input transformation by:
determining a granularity property according to:

$$SET(EVAL(exp, LET(I))) + SET\left(\underset{i \text{ in } LET(I)}{CONCAT}(EVAL(exp, i))\right)$$

where I represents the expression input, SET is a set operator, CONCAT is a concatenation operator, EVAL is an expression evaluation operator, LET concatenates XML items of expression input I into a sequence, and exp represents the expression receiving the expression input; and transforming the expression input into a transformed data stream input, the transforming being conditioned upon the granularity property being true.

9. The XML query compilation processor as set forth in claim 8, wherein the query rewrite processor is adapted to perform the expression input transformation by further;
determining a duplication property for each consumer of the output stream of individual XML items indicating whether duplicates in the output stream of individual XML items are problematic for that consumer; and
determining an ordering dependence property for each consumer indicating whether a selected ordering is required for that consumer; and
applying one or more corrections including at least one of:
removing duplicates from the output stream of individual XML items flowed to a consumer for which said duplicates are problematic, and
sorting the output stream of individual XML items into a selected ordering required for a consumer.

10. The XML query compilation processor as set forth in claim 8, wherein the XML query compilation processor processes XQuery XML queries, the expression input is a concatenated sequence input corresponding to an XQuery LET clause, and the query rewrite processor is adapted to perform the expression input transformation by further;
transforming the concatenated sequence input into a data stream of individual unconcatenated XML items corresponding to an XQuery FOR clause.

11. An article of manufacture including a program storage medium storing instructions executable by an associated computer, the instruction embodying an XML query compilation processor as comprising:
an execution compiler transforming an XML query into an executable XML query plan; and
a query rewrite processor is performing query transformations on the XML query, said query transformations including transforming an expression input received by an expression that produces an output stream of individual XML items conditional upon a set of items defined by the output stream of individual XML items being independent of grouping of items in the expression input and being adapted to perform the expression input by:
determining a granularity property including sub-properties (i), (ii), and (iii) according to:

$$SET\left(\underset{p \text{ in } P(I)}{CONCAT}(EVAL(exp, p))\right) = SET\left(\underset{p \text{ in } I}{CONCAT}(EVAL(exp, p))\right), \quad \text{(i)}$$

$$\underset{p \text{ in } P(I)}{CONCAT}(EVAL(exp, p)) \text{ is duplicate-free, and} \quad \text{(ii)}$$

(iii) the XML items in $$\underset{p \text{ in } P(I)}{CONCAT}(EVAL(exp, p))$$

are in the selected ordering,
where I represents the expression input, P(I) is a partition operator, SET is a set operator, CONCAT is a concatenation operator, EVAL is an expression evaluation operator, exp represents the expression receiving the expression input, sub-property (ii) being included conditional upon a duplicate-free output stream being required, and sub-property (iii) being included conditional upon a selected ordering of the output stream being required; and
removing an imposition of a grouping of XML items on the expression input, the removing being conditioned upon the granularity property meeting a selected criterion.

* * * * *